United States Patent
Zhu et al.

(10) Patent No.: US 9,396,498 B1
(45) Date of Patent: Jul. 19, 2016

(54) SYSTEMS AND METHODS FOR USING SOCIAL-NETWORKING ACCOUNTS TO IDENTIFY CHARACTERISTICS THAT STRANGERS SHARE IN COMMON

(75) Inventors: Xiaole Zhu, Beijing (CN); Xue Feng Tian, Beijing (CN); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 847 days.

(21) Appl. No.: 13/302,753

(22) Filed: Nov. 22, 2011

(51) Int. Cl.
*G06F 15/16* (2006.01)
*G06Q 50/00* (2012.01)
*H04L 12/58* (2006.01)

(52) U.S. Cl.
CPC .............. *G06Q 50/01* (2013.01); *H04L 12/588* (2013.01)

(58) Field of Classification Search
CPC ............................... G06Q 50/01; H04L 12/588
USPC ........................................................ 709/204
See application file for complete search history.

(56) References Cited

U.S. PATENT DOCUMENTS

| | | | |
|---|---|---|---|
| 2007/0124721 A1* | 5/2007 | Cowing ............ | G06F 17/30041 717/100 |
| 2007/0156664 A1* | 7/2007 | Norton et al. ...................... | 707/3 |
| 2010/0112991 A1* | 5/2010 | Hannaby ..................... | 455/414.3 |
| 2010/0198812 A1* | 8/2010 | Athsani ............. | G06F 17/30867 707/722 |
| 2010/0280904 A1* | 11/2010 | Ahuja ........................ | 705/14.58 |
| 2011/0107431 A1* | 5/2011 | Sukanen ......................... | 726/27 |
| 2011/0191352 A1* | 8/2011 | Jones et al. .................... | 707/749 |
| 2011/0288942 A1* | 11/2011 | De Wet et al. ............. | 705/14.73 |
| 2013/0104080 A1* | 4/2013 | Bosworth et al. ............. | 715/838 |
| 2013/0110641 A1* | 5/2013 | Ormont et al. ............. | 705/14.66 |

OTHER PUBLICATIONS

J. Haikio, et al., 'Would You Be My Friend?'—Creating a Mobile Friend Network with 'Hot in the City', System Sciences (HICSS), 2010 43rd Hawaii International Conference, Jan. 5-8, 2010, pp. 1-10, http://ieeexplore.ieee.org/xpl/freeabs_all.jsp?tp=&arnumber=5428696&tag=1.

Timo, "RFID and Physical Social Networks", Interaction Design, News, Product Design, Sep. 30, 2008, http://www.nearfield.org/2008/09/rfid-and-physical-social-networks.

Meevr, Organize Your Social Networks!, http://www.meevr.com/, as accessed Mar. 13, 2012.

Stroodle, Stroodle—Your Social Pulse, http://www.stroodle.it/, as accessed Mar. 13, 2012.

(Continued)

*Primary Examiner* — Joseph Greene
(74) *Attorney, Agent, or Firm* — ALG Intellectual Property, LLC

(57) ABSTRACT

A computer-implemented method may include facilitating registration for a service capable of determining whether strangers who come in contact with one another share one or more characteristics in common. The computer-implemented method may also include obtaining, as part of the registration for the service, permission for the service to access at least a portion of one or more social-networking accounts associated with each of the strangers. The computer-implemented method may further include determining, subsequent to the registration for the service, that the strangers registered for the service have come in contact with one another and then providing the service to the strangers in response to this determination. Various other methods, systems, and computer-readable media are also disclosed.

19 Claims, 8 Drawing Sheets

(56) References Cited

OTHER PUBLICATIONS

Tuppy, http://tuppy.com/, as accessed Mar. 13, 2012.

New Tech Post, NFC: Using Your Mobile to Make Natural Connections, http://newtechpost.com/2011/03/03/nfc-using-your-mobile-to-make-natural-connections, as accessed May 31, 2012.

* cited by examiner

```
           Social-Networking Account                             Social-Networking Account
                    210(1)                                                210(N)
------------------------------------------------------     ------------------------------------------------------
****************************************************     ****************************************************

USER: John Johnson                                         USER: Jane Jackson

FRIENDS: Joe Dawson                                        FRIENDS: Angie Adams
         Chris Henneman                                             Tracy Bowman
         Ashley Jackson                                             Ron Drake
         Naomi Lewis                                                Naomi Lewis
         Troy Richardson                                            Richard Newton
         Chip Taylor                                                Hope Tolbert EMPLOYER: State Insurance                                  EMPLOYER: Custom Computers PAST EMPLOYER: Custom Computers                            PAST EMPLOYER: Universal Capital EDUCATION: State University                                EDUCATION: State University PLACE OF RESIDENCE: Reno, Nevada                           PLACE OF RESIDENCE: Las Vegas, Nevada RELIGION: Christian                                        RELIGION: Christian POLITICAL AFFILIATION: Liberal                             POLITICAL AFFILIATION: Conservative FAVORITE BOOKS: THREE MUSKETEERS                           FAVORITE BOOKS: THE CALL OF THE WILD
                HAMLET                                                     HAMLET
                A TALE OF TWO CITIES                                       A TALE OF TWO CITIES FAVORITE MOVIES: GONE WITH THE WIND                        FAVORITE MOVIES: GONE WITH THE WIND
                 A NIGHT AT THE OPERA                                       FORREST GUMP
                 CASABLANCA                                                 SCHINDLER'S LIST FAVORITE MUSICAL ARTISTS: THE BEATLES                      FAVORITE MUSICAL ARTISTS: TINA TURNER
                          FRANK SINATRA                                              PRINCE HOBBIES: Chess                                             HOBBIES: Painting
         Gardening                                                  Gardening
         Piano                                                      Guitar

```
              Social-Networking Account
                       212(1)
-------------------------------------------------------
*******************************************
USER: John Johnson CONNECTIONS: Keri Hollister
             Tracy Bowman
             Rochelle Foster
             Naomi Lewis
             Ross Harper
             Tyler West EMPLOYER: State Insurance PAST EMPLOYER: Custom Computers EDUCATION: State University PLACE OF RESIDENCE: Reno, Nevada

Characteristics Information
126

---
***********************************************

USERS: John Johnson
       Jane Jackson

FRIENDS IN COMMON: Naomi Lewis
                   Tracy Bowman

EDUCATION IN COMMON: State University

EMPLOYER IN COMMON: Custom Computers

RELIGION IN COMMON: Christian

FAVORITE BOOKS IN COMMON: HAMLET
                          A TALE OF TWO CITIES
HOBBY IN COMMON: Gardening

SYSTEMS AND METHODS FOR USING SOCIAL-NETWORKING ACCOUNTS TO IDENTIFY CHARACTERISTICS THAT STRANGERS SHARE IN COMMON

BACKGROUND

In recent years, social-networking platforms (such as FACEBOOK, TWITTER, and LINKEDIN) have become popular with numerous Internet users. Such social-networking platforms may enable users to stay in touch with one another and/or connect with new people. For example, a user of a social-networking platform may create a personal account (sometimes referred to as a profile) and add one or more other users of the social-networking platform to a list of friends associated with his or her personal account. In this example, once the user and the other users have become friends on the social-networking platform, these users may be able to view personal information associated with each others' personal accounts and potentially identify one or more characteristics that they share in common.

However, the process of becoming friends on such a social-networking platform may involve one or more obstacles that delay the users' ability to view each others' personal information. For example, a user of a social-networking platform may send a friend request to another user to initiate the process of becoming friends on the social-networking platform. The user may then need to wait for the other user to accept the friend request before the user is able to view the personal information associated with the other user's personal account. As a result, these users may be unable to identify characteristics that they share in common upon coming in contact with one another for the first time (e.g., at a work function, at a social event, or in an online forum).

In addition, some Internet users may choose to utilize only a limited number of social-networking platforms. Unfortunately, users of one social-networking platform may be unable to interact with users of another social-networking platform. As a result, these users (like those mentioned in the example above) may be unable to identify characteristics that they share in common upon coming in contact with one another for the first time. As such, the instant disclosure identifies a need for efficient and effective mechanism for enabling users of different social-networking platforms to identify characteristics that they share in common upon coming in contact with one another for the first time.

SUMMARY

As will be described in greater detail below, the instant disclosure generally relates to systems and methods for using social-networking accounts to identify characteristics that strangers share in common. In one example, a computer-implemented method for using social-networking accounts to identify characteristics that strangers share in common may include (1) facilitating registration for a service capable of determining whether strangers who come in contact with one another share one or more characteristics in common, (2) obtaining, as part of the registration for the service, permission for the service to access at least a portion of one or more social-networking accounts associated with each of the strangers, (3) determining, subsequent to the registration for the service, that the strangers registered for the service have come in contact with one another, and then (4) providing the service to the strangers in response to this determination by (a) analyzing personal information about the strangers accessible via the social-networking accounts associated with the strangers, (b) determining, based on the analysis of the personal information, whether the strangers share one or more characteristics in common, and then (c) providing characteristics information that indicates whether the strangers share one or more characteristics in common to one or more computing devices associated with one or more of the strangers to facilitate presentation of the characteristics information to the strangers upon coming in contact with one another.

Examples of such characteristics that the strangers may share in common include, without limitation, a common friend, a common acquaintance, a common employer, a common profession, a common school, a common place of residence, a common online follower, a common person being followed online, a common religion, a common relationship status, a common political affiliation, a common conference, a common check-in location, a common association with a particular organization, a common association with a particular social-networking platform, a common business connection, a common musical interest, a common favorite book, a common favorite movie, a common favorite musical artist, a common favorite television show, a common favorite game, a common favorite activity, a common favorite athlete, a common hobby, and/or any other suitable characteristics that the strangers may share in common.

In some examples, the method may also include obtaining one or more usernames and one or more passwords associated with the strangers' social-networking accounts. In such examples, the method may further include enabling the service to access the strangers' social-networking accounts by entering the usernames and passwords associated with the strangers' social-networking accounts. The strangers' social-networking accounts may represent a plurality of social-networking accounts associated with a plurality of different social-networking platforms (such as FACEBOOK, TWITTER, and LINKEDIN).

In some examples, the method may also include accessing the strangers' social-networking accounts to obtain the personal information and storing a copy of the personal information in a storage device associated with the service to facilitate analyzing the personal information. The method may further include implementing a data mining technique that provides at least a portion of the service and/or a machine learning technique that provides at least a portion of the service.

In some examples, the method may also include parsing the personal information about the strangers into informational components and comparing the informational components parsed from the personal information about the strangers. In such examples, the method may further include identifying at least one pattern of informational components that is common to each of the strangers. In addition, the method may include configuring the characteristics information by (1) identifying the informational components that represent the common pattern and then (2) reforming the informational components that represent the common pattern to facilitate presentation of these informational components to the strangers upon coming in contact with one another.

In some examples, the method may also include determining that a computing device associated with a particular stranger is located physically proximate to a different computing device associated with a different stranger. In one example, the method may include using a transponder (such as a near field communication ("NFC") technology, a radio frequency identification ("RFID") technology, a contactless smart card technology, or a Bluetooth technology) associated with the computing device and a different transponder associated with the different computing device to determine that the computing device is located physically proximate to the different computing device.

In some examples, the method may also include receiving a communication manually initiated by at least one of the strangers that indicates that the strangers have come in contact with one another. In one example, the method may include detecting an in-person encounter between the strangers. In another example, the method may include detecting an online encounter between the strangers.

In one embodiment, a system for implementing the above-described method may include a registration module programmed to (1) facilitate registration for a service capable of determining whether strangers who come in contact with one another share one or more characteristics in common and (2) obtain, as part of the registration for the service, permission for the service to access at least a portion of one or more social-networking accounts associated with each of the strangers. The system may also include a service module programmed to (1) determine, subsequent to the registration for the service, that the strangers registered for the service have come in contact with one another and (2) provide the service to the strangers in response to this determination by (a) analyzing personal information about the strangers accessible via the social-networking accounts associated with the strangers, (b) determining, based on the analysis of the personal information about the strangers, whether the strangers share one or more characteristics in common, and then (c) providing characteristics information that indicates whether the strangers share one or more characteristics in common to one or more computing devices associated with one or more of the strangers to facilitate presentation of the characteristics information to the strangers upon coming in contact with one another.

In another embodiment, the above-described method may be encoded as computer-readable instructions on a computer-readable-storage medium. For example, a computer-readable-storage medium may include one or more computer-executable instructions that, when executed by at least one processor of a computing device, may cause the computing device to (1) facilitate registration for a service capable of determining whether strangers who come in contact with one another share one or more characteristics in common, (2) obtain, as part of the registration for the service, permission for the service to access at least a portion of one or more social-networking accounts associated with each of the strangers, (3) determine, subsequent to the registration for the service, that the strangers registered for the service have come in contact with one another, and then (4) provide the service to the strangers in response to this determination by (a) analyzing personal information about the strangers accessible via the social-networking accounts associated with the strangers, (b) determining, based on the analysis of the personal information, whether the strangers share one or more characteristics in common, and then (c) providing characteristics information that indicates whether the strangers share one or more characteristics in common to one or more computing devices associated with one or more of the strangers to facilitate presentation of the characteristics information to the strangers upon coming in contact with one another.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of exemplary social-networking accounts capable of being used to identify characteristics that strangers share in common.

FIG. 5 is an illustration of an exemplary social-networking account capable of being used to identify characteristics that strangers share in common.

FIG. 6 is an illustration of exemplary characteristics information capable of being presented to strangers whose social-networking accounts have been analyzed to identify common characteristics.

Figure 1:
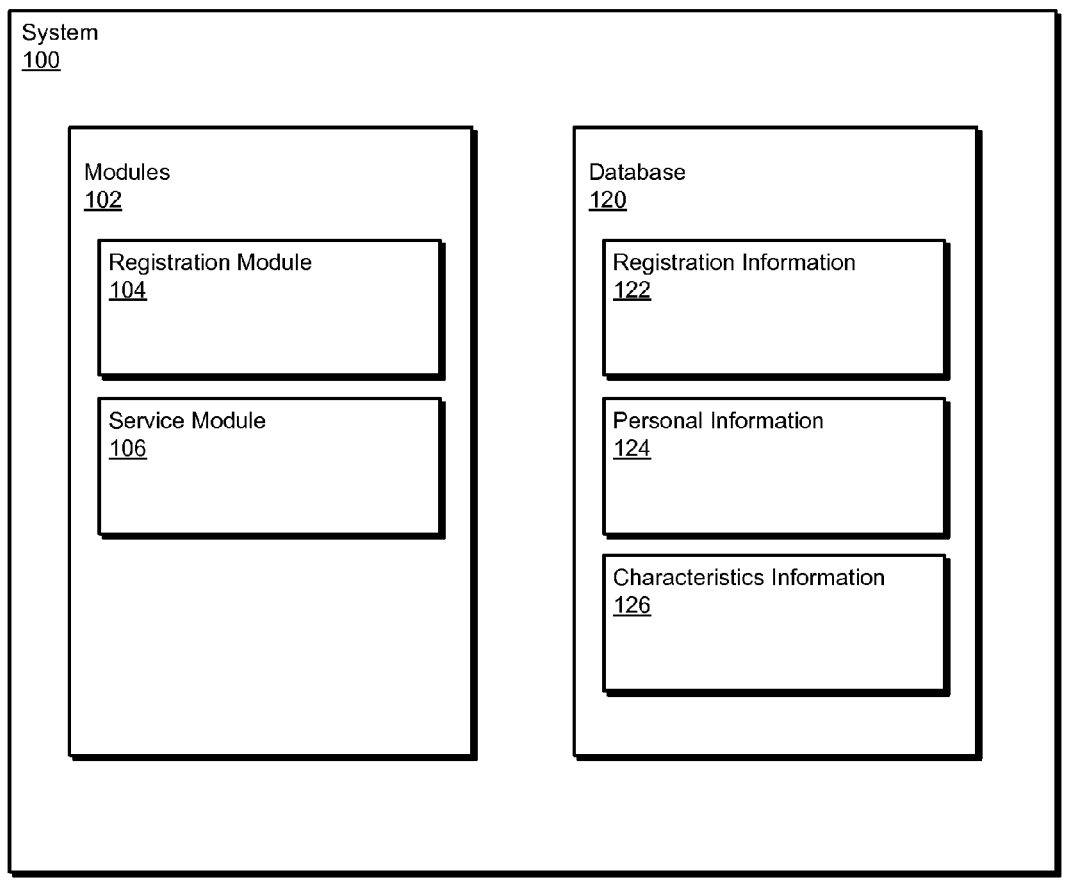
FIG. 1 is a block diagram of an exemplary system for using social-networking accounts to identify characteristics that strangers share in common.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using social-networking accounts to identify characteristics that strangers share in common. The term "strangers," as used herein, generally refers to users of a service who do not know one another, or do not know one another very well. In addition, for purposes of simplicity, the terms "strangers" and "users" may be used interchangeably throughout the instant disclosure.

In one example, two or more strangers may register for a service capable of determining whether the strangers share any characteristics in common. As part of the registration process, the strangers may each provide permission for the service to access one or more of their social-networking accounts. After registering for the service, the strangers may meet one another for the first time at a social event and wonder if they have any mutual friends or share any common interests. The service may detect this in-person encounter between the strangers based on transponders integrated in the strangers' mobile devices. In response to detecting this in-person encounter, the service may access the strangers' social-networking accounts to analyze personal information about the strangers.

In one example, the service may determine, based on this analysis of the strangers' personal information, that the strangers have two mutual friends and both enjoy gardening. The service may generate characteristics information that identifies the strangers' mutual friends and common interests and then provide the characteristics information to the strangers' mobile devices for presentation to the strangers. By presenting the characteristics information to the strangers when they come in contact with one another for the first time, the service may help the strangers become instantly familiar with one another and provide a common-ground basis upon which the strangers may build a friendship.

Figure 2:
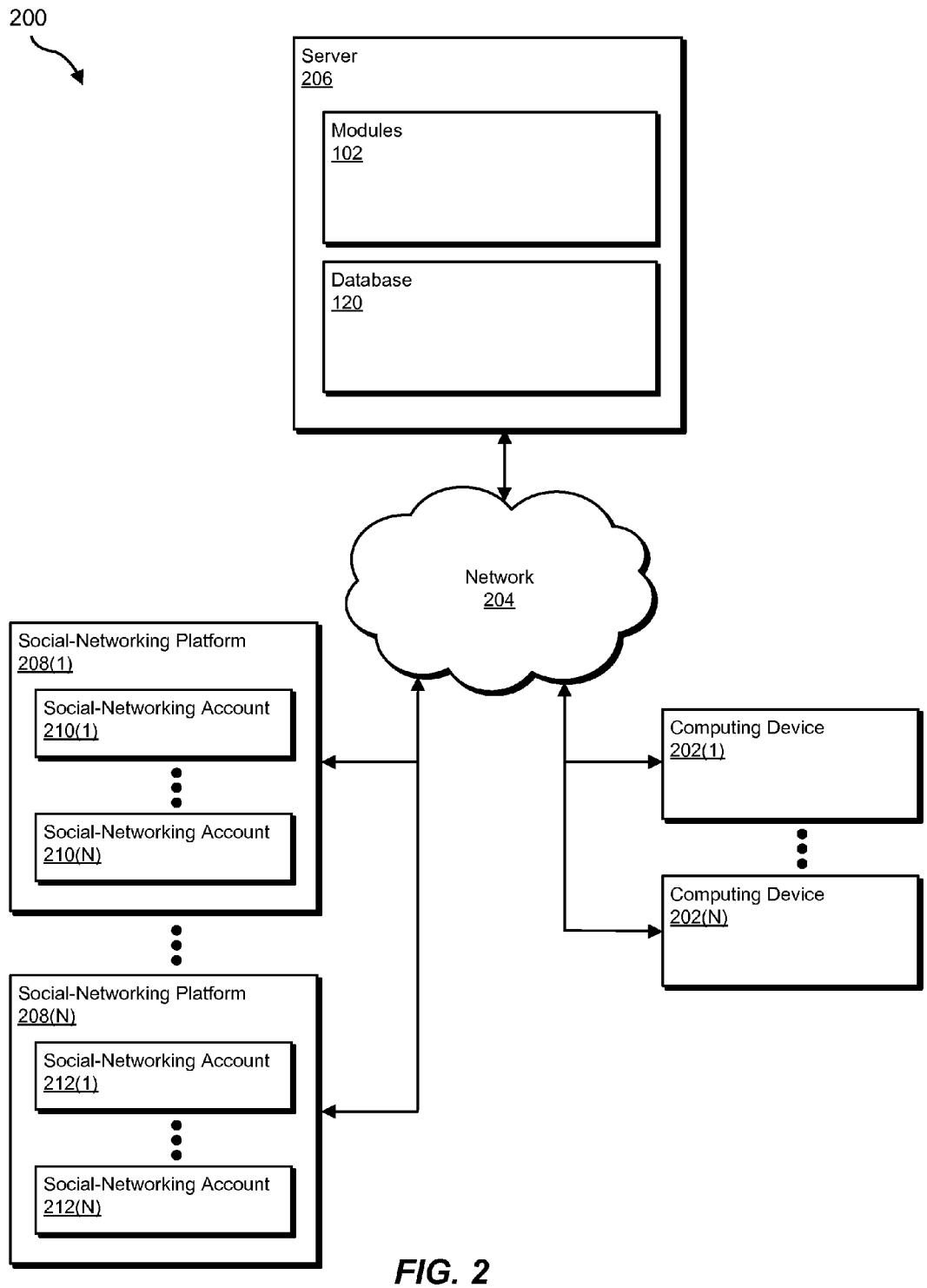
FIG. 2 is a block diagram of an exemplary system for using social-networking accounts to identify characteristics that strangers share in common.

The following will provide, with reference to FIGS. 1-2, detailed descriptions of exemplary systems for using social-networking accounts to identify characteristics that strangers share in common. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for using social-networking accounts to identify characteristics that strangers share in common. As illustrated in this figure, exemplary system 100 may include one or more modules 102 for performing one or more tasks. For example, and as will be explained in greater detail below, exemplary system 100 may include a registration module 104 programmed to (1) facilitate registration for a service capable of determining whether strangers who come in contact with one another share one or more characteristics in common and (2) obtain, as part of the registration for the service, permission for the service to access at least a portion of one or more social-networking accounts associated with each of the strangers.

The system may also include a service module 106 programmed to (1) determine, subsequent to the registration for the service, that the strangers registered for the service have come in contact with one another and (2) provide the service to the strangers in response to this determination by (a) analyzing personal information about the strangers accessible via the social-networking accounts associated with the strangers, (b) determining, based on the analysis of the personal information about the strangers, whether the strangers share one or more characteristics in common, and then (c) providing characteristics information that indicates whether the strangers share one or more characteristics in common to one or more computing devices associated with the strangers to facilitate presentation of the characteristics information to the strangers upon coming in contact with one another. Although illustrated as separate elements, one or more of modules 102 in FIG. 1 may represent portions of a single module, application, and/or service (such as the service described herein).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N), server 206, and/or social-networking platforms 208(1)-(N)), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store registration information 122, personal information 124, and/or characteristics information 126. As will be described in greater detail below, one or more of modules 102 may use at least a portion of the information stored in database 120 to identify characteristics that strangers share in common.

Registration information 122 generally represents any type or form of information obtained as part of a registration process that involves registering for a service capable of determining whether strangers share characteristics in common. Examples of registration information 122 include, without limitation, identification information that identifies users of the service, contact information (such as physical addresses, email addresses, and/or telephone numbers of users), device information that identifies users' computing devices (such as device identifiers associated with users' computing devices), account information that facilitates access to users' social-networking accounts (such as usernames and passwords associated with users' social-networking accounts), policy information that identifies which portions of the users' social-networking accounts are accessible to the service, and/or any other suitable registration information.

Personal information 124 generally represents any type or form of information obtained from social-networking accounts associated with users that have registered for a service capable of determining whether strangers share characteristics in common. Personal information 124 may also identify characteristics of users that have registered for such a service. Examples of personal information 124 include, without limitation, information that identifies users' friends, users' acquaintances, users' employers, users' professions, schools attended by users, users' places of residence, users' online followers, people being followed online by users, users' religions, users' relationship statuses, users' political affiliations, conferences attended by the users, check-in locations identified by the users, users' associations with particular organizations, users' associations with particular social-networking platforms, users' business connections, users' musical interests, users' favorite books, users' favorite movies, users' favorite musical artists, users' favorite television shows, users' favorite games, users' favorite activities, users' favorite athletes, users' hobbies, and/or any other suitable personal information that identifies characteristics of users that have registered for a service capable of determining whether strangers share characteristics in common.

Characteristics information 126 generally represents any type or form of information that identifies one or more characteristics that particular strangers share in common. For example, characteristics information 126 may indicate that two particular strangers who have come in contact with one another have two mutual friends and both enjoy gardening. Although characteristics information 126 generally represents information that identifies one or more characteristics that particular strangers share in common, characteristics information 126 may also, in some examples, represent information that indicates that particular strangers share no known characteristics in common.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) and social-networking platforms 208(1)-(N) in communication with server 206 via a network 204. In addition, social-networking platforms 208(1)-(N) may collectively include social-networking accounts 210(1)-(N) and 212(1)-(N).

In one embodiment, one or more of modules 102 from FIG. 1 may, when executed by at least one processor of server 206, enable server 206 to use social-networking accounts 210(1)-(N) and 212(1)-(N) to identify characteristics that strangers share in common. For example, and as will be described in greater detail below, one or more of modules 102 may cause server 206 to (1) facilitate registration for a service capable of determining whether strangers who come in contact with one another share one or more characteristics in common, (2) obtain, as part of the registration for the service, permission for the service to access at least a portion of one or more social-networking accounts associated with each of the strangers, (3) determine, subsequent to the registration for the service, that the strangers registered for the service have come in contact with one another, and then (4) provide the service to the strangers in response to this determination by (a) analyzing personal information about the strangers accessible via the social-networking accounts associated with the strangers, (b) determining, based on the analysis of the personal information, whether the strangers share one or more characteristics in common, and then (c) providing characteristics information that indicates whether the strangers share one or more characteristics in common to one or more computing devices associated with one or more of the strangers to facilitate presentation of the characteristics information to the strangers upon coming in contact with one another.

Computing devices 202(1)-(N) generally represent any type or form of computing device capable of reading computer-executable instructions. Examples of computing devices 202(1)-(N) include, without limitation, laptops, desktops, servers, cellular phones, personal digital assistants (PDAs), multimedia players, embedded systems, combinations of one or more of the same, exemplary computing system 710 in FIG. 7, or any other suitable computing devices.

Server 206 generally represents any type or form of computing device that is capable of accessing, collecting, analyzing, and/or providing information associated with characteristics that strangers may share in common. Examples of server 206 include, without limitation, application servers, web servers, and database servers configured to provide various database services and/or run certain software applications.

Social-networking platforms 208(1)-(N) generally represent any type or form of software (such as a website) that enables users of the software to remotely connect and/or communicate with one another. Each of social-networking platforms 208(1)-(N) may be implemented on at least one computing device (such as a web server) accessible to server 206 via network 204. Examples of social-networking platforms 208(1)-(N) include, without limitation, FACEBOOK, TWITTER, LINKEDIN, MYSPACE, GOOGLE+, TAGGED, MYYEARBOOK, MEETUP, MYLIFE, MYHERITAGE, MULTIPLY, ORKUT, NING, CLASSMATES.COM, BEBO, FRIENDSTER, HI5, ORKUT, PERFSPOT, ZORPIA, NETLOG, HABBO, or any other website that facilitates online social networking.

Social-networking accounts 210(1)-(N) and 212(1)-(N) generally represent any type or form of personal account (such as a profile) provided by a social-networking platform. Each of social-networking accounts 210(1)-(N) and 212(1)-(N) may be associated with a particular user or entity. In addition, social-networking accounts 210(1)-(N) and 212(1)-(N) may include various personal information about the user or entity associated with social-networking accounts 210(1)-(N) and 212(1)-(N).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication among computing devices 202(1)-(N), social-networking platforms 208(1)-(N), and/or server 206.

Figure 3:
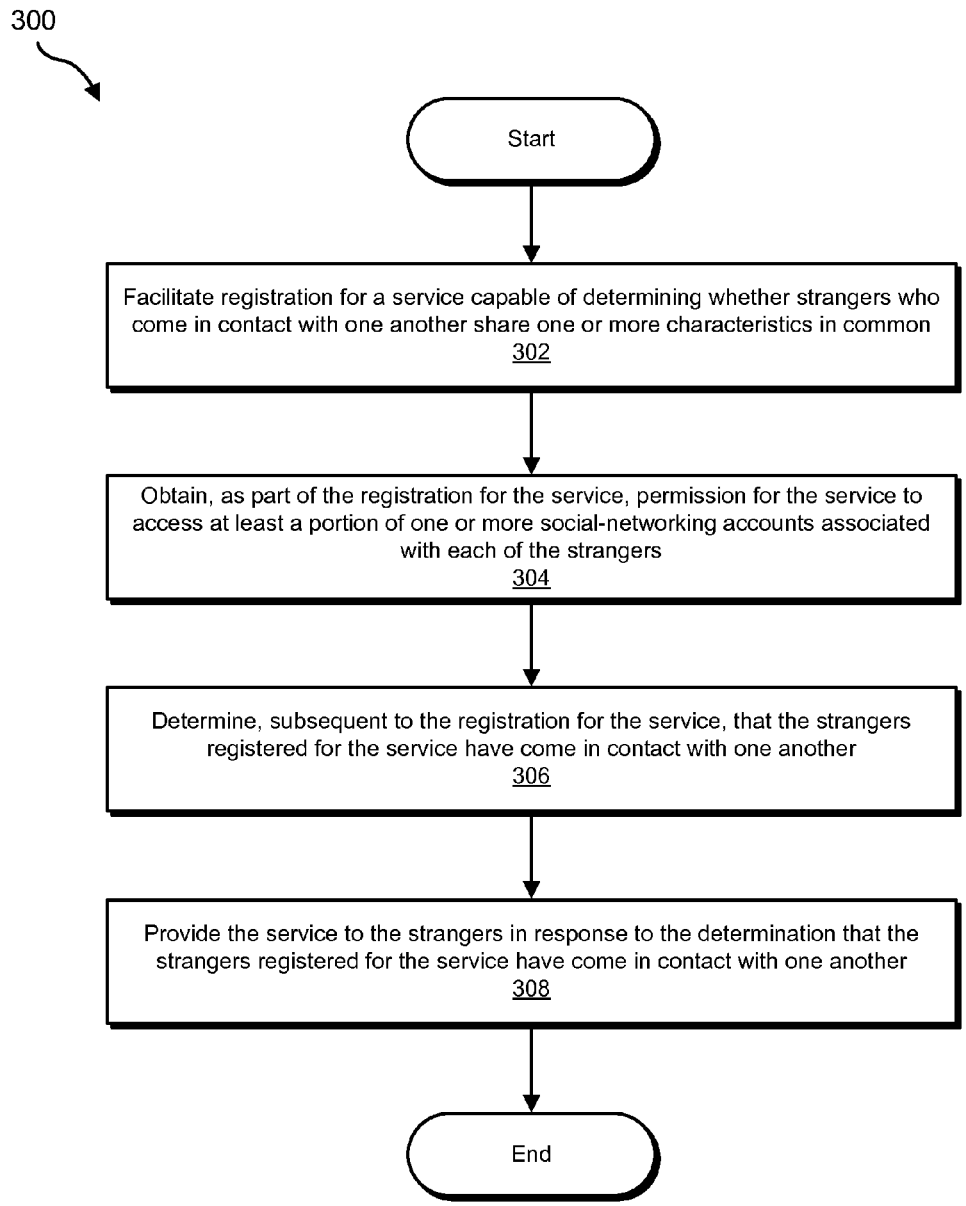
FIG. 3 is a flow diagram of an exemplary method for using social-networking accounts to identify characteristics that strangers share in common.

FIG. 3 is a flow diagram of an exemplary computer-implemented method 300 for using social-networking accounts to identify characteristics that strangers share in common. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated at step 302 in FIG. 3, one or more of the various systems described herein may facilitate registration for a service capable of determining whether strangers who come in contact with one another share one or more characteristics in common. For example, registration module 104 may, as part of server 206 in FIG. 2, facilitate registration for a service capable of determining whether users of computing devices 202(1)-(N) share one or more characteristics in common. In this example, users of computing devices 202(1)-(N) may be strangers who do not know one another very well or even at all.

The systems described herein may perform step 302 in a variety of ways. In some examples, registration module 104 may provide a user interface accessible to the users of computing devices 202(1)-(N) to enable the users to register (or sign up) for the service. In one example, registration module 104 may provide a website that facilitates registration for the service to the users of computing devices 202(1)-(N) via network 204. In this example, the website may interface with registration module 104 via network 204 to enable the users of computing devices 202(1)-(N) to transmit user input to registration module 104 as part of the registration process.

In another example, registration module 104 may provide a software application or plug-in capable of being downloaded by the users of computing devices 202(1)-(N) to enable the users to register (or sign up) for the service. In this example, the downloadable software application or plug-in may interface with registration module 104 via network 204 to enable the users of computing devices 202(1)-(N) to transmit user input to registration module 104 as part of the registration process.

In some examples, the user interface provided by registration module 104 may enable each of the users of computing devices 202(1)-(N) to create, as part of the registration process, a personal profile associated with the service. For example, the user of computing device 202(1) may enter user input to create a username (e.g., "JJOHNSON") and password (e.g., "MYPASSWORD") associated with this service profile. In this example, registration module 104 may obtain the user input entered by the user of computing device 202(1) and create the user's profile for the service based on the user input.

As will be described in greater detail below, this service may be capable of determining whether strangers who come in contact with one another share any characteristics in common. Examples of such characteristics that the strangers may share in common include, without limitation, a common friend, a common acquaintance, a common employer, a common profession, a common school, a common place of residence, a common online follower, a common person being followed online, a common religion, a common relationship status, a common political affiliation, a common conference, a common check-in location, a common association with a particular organization, a common association with a particular social-networking platform, a common business connection, a common musical interest, a common favorite book, a common favorite movie, a common favorite musical artist, a common favorite television show, a common favorite game, a common favorite activity, a common favorite athlete, a common hobby, and/or any other suitable characteristics that the strangers may share in common.

As illustrated at step 304 in FIG. 3, one or more of the various systems described herein may, as part of the registration process, obtain permission for the service to access at least a portion of one or more social-networking accounts associated with the strangers. For example, registration module 104 may, as part of server 206 in FIG. 2, obtain permission (whether implicit or explicit) for the service to access at least a portion of social-networking accounts 210(1)-(N) and 212(1)-(N) associated with the users of computing devices 202(1)-(N). In one example, such permission may be implied by the users' attempts to register for the service. In another example, such permission may be explicitly obtained from the users as part of the registration process.

The systems described herein may perform step 304 in a variety of ways. In one example, registration module 104 may obtain one or more usernames (such as nicknames, screen names, and/or email addresses) associated with social-networking accounts 210(1)-(N) and 212(1)-(N). In this example, registration module 104 may also obtain one or more passwords associated with social-networking accounts 210(1)-(N) and 212(1)-(N). By obtaining such usernames and passwords associated with social-networking accounts 210(1)-(N) and 212(1)-(N), registration module 104 may enable the service to access at least a portion of social-networking accounts 210(1)-(N) and 212(1)-(N) by entering the usernames and passwords in social-networking platforms 208(1)-(N).

In a more specific example, a user of computing device 202(1) may enter his username (e.g., "JOHNJOHNSON@EMAIL.COM") and password (e.g., "MYPASSWORD") associated with social-networking platform 208(1) into the user interface provided by registration module 104. In this example, the user of computing device 202(1) may also enter a different username (e.g., "JJOHNSON") and a different password (e.g., "MYOTHERPASSWORD") associated with social-networking platform 208(N) into the user interface. Registration module 104 may then obtain the user's usernames and passwords via the user interface and store the usernames and passwords as part of registration information 122 located in database 120. Upon storing the user's usernames and passwords as part of registration information 122, registration module 104 may enable the service to access at least a portion of social-networking accounts 210(1) and 212(1) by entering the usernames and passwords in social-networking platforms 208(1)-(N).

Although the above example demonstrates that usernames and passwords associated with a particular user may vary across different social-networking platforms, such usernames and/or passwords may also, in some examples, remain identical across different social-networking platforms. For example, a user of computing device 202(N) may enter her username (e.g., "JANEJACKSON@EMAIL.COM") and password (e.g., "PASSWORD1") associated with social-networking platform 208(1) into the user interface provided by registration module 104. In this example, the user of computing device 202(N) may enter additional user input indicating that the same username and password also apply to her social-networking account associated with social-networking platform 208(N).

In one example, registration module 104 may provide certain terms and conditions for use of the service to the users registering for the service. For example, prior to obtaining the usernames and passwords associated with the users registering for the service, registration module 104 may provide a dialog box that displays the terms and conditions for use of the service to the users. In this example, the terms and conditions may explicitly request permission from the users to access social-networking accounts 210(1)-(N) and 212(1)-(N) as part of the service. The users may need to agree to such terms and conditions to qualify for the service and/or to complete the registration process.

As illustrated at step 306 in FIG. 3, one or more of the various systems described herein may, subsequent to the registration process, determine that the strangers registered for the service have come in contact with one another. For example, service module 106 may, as part of server 206 in FIG. 2, determine that the users of computing devices 202(1)-(N) have come in contact with one another. In this example, the users of computing devices 202(1)-(N) may be strangers at the point in time that service module 106 determines that the users have come in contact with one another.

The systems described herein may perform step 306 in a variety of ways. In some examples, service module 106 may detect an in-person encounter between the users of computing devices 202(1)-(N). For example, service module 106 may detect the in-person encounter by determining that computing device 202(1) is located physically proximate to computing device 202(N). In one example, service module 106 may receive at least one communication from at least one of computing devices 202(1)-(N) via network 204. The communication received by service module 106 may indicate that computing devices 202(1)-(N) are located physically proximate to one another.

In some examples, each of computing devices 202(1)-(N) may include a transponder capable of transmitting communications to and/or receiving communications from compatible transponders located within a particular operating range. In such examples, the service may use the transponders included in computing devices 202(1)-(N) to determine that the users of computing devices 202(1)-(N) have come in contact with one another. Examples of such transponders include, without limitation, NFC technologies, RFID technologies, contactless smart card technologies, Bluetooth technologies, and/or any other suitable transponders.

In a more specific example, the users of computing devices 202(1)-(N) may attend a particular social event and bring computing devices 202(1)-(N) to the social event. While attending the social event, the users may bring computing devices 202(1)-(N) sufficiently close to one another to facilitate communication between the transponders included in computing devices 202(1)-(N). For example, the transponder included in computing device 202(1) may transmit (or broadcast) a communication capable of being received by the transponder included in computing device 202(N). The communication transmitted by the transponder may specify that computing device 202(1) transmitted the communication and/or indicate that the user of computing device 202(1) is registered for the service.

In one example, the transponder included in computing device 202(1) may transmit the communication in response to user input. For example, the user of computing device 202(1) may manually enter user input that initiates transmission of the communication. In another example, the transponder included in computing device 202(1) may be configured to periodically transmit such a communication to facilitate detection of an in-person encounter between the user of computing device 202(1) and at least one other user registered for the service (e.g., the user of computing device 202(N)).

In one example, in response to receiving the communication, the transponder included in computing device 202(N) may prompt computing device 202(N) to transmit an additional communication to service module 106 via network 204. The additional communication transmitted by computing device 202(N) may indicate that computing devices 202(1)-(N) are located physically proximate to one another. Service module 106 may receive the additional communication transmitted by computing device 202(N) and then determine, based at least in part on the additional communication, that the users of computing devices 202(1)-(N) have come in contact with one another.

In another example, the transponder included in computing device 202(N) may transmit a reply communication to the transponder included in computing device 202(1). The reply communication may specify that computing device 202(N) received the communication transmitted by computing device 202(1) and/or indicate that the user of computing device 202(N) is registered for the service. The transponder included in computing device 202(1) may then receive the reply communication transmitted by the transponder included in computing device 202(N).

In this example, in response to receiving the communication, the transponder included in computing device 202(1) may prompt computing device 202(1) to transmit a further communication to service module 106 via network 204. The further communication transmitted by computing device 202(1) may indicate (similar to the additional communication described above) that computing devices 202(1)-(N) are located physically proximate to one another. Service module 106 may receive the further communication transmitted by computing device 202(1) and then determine, based at least in part on the further communication, that the users of computing devices 202(1)-(N) have come in contact with one another.

In some examples, service module 106 may detect an online encounter between the users of computing devices 202(1)-(N). In one example, service module 106 may detect the online encounter by receiving a manually initiated communication indicating that the users of computing devices 202(1)-(N) have come in contact with one another in an online forum (such as a message board or chat room). For example, the user of computing device 202(1) may meet the user of computing device 202(N) in an online chat room hosted by CHATROULLETTE.COM. In this example, while chatting in the online chat room hosted by CHATROULETTE.COM, the user of computing device 202(1) may obtain sufficient information about the user of computing device 202(N) (e.g., the username associated with the user's profile for the service) to identify the user of computing device 202(N) to service module 106.

Upon obtaining such information about the user of computing device 202(N) in the online chat room, the user of computing device 202(1) may manually initiate transmission of a communication to service module 106 via network 204. The manually initiated communication may indicate that the users of computing devices 202(1)-(N) have come in contact with one another in an online forum. Service module 106 may receive the manually initiated communication and then determine, based at least in part on the manually initiated communication, that the users of computing devices 202(1)-(N) have come in contact with one another.

The users of computing devices 202(1)-(N) may have varying degrees of familiarity with one another at the point in time that service module 106 determines that the users have come in contact with one another. In some examples, the users of computing devices 202(1)-(N) may not know one another at all at the point in time that service module 106 determines that the users have come in contact with one another. For example, the users of computing devices 202(1)-(N) may be coming in contact with one another for the first time on this occasion. In one example, the users of computing devices 202(1)-(N) may have never heard of one another prior to coming in contact with one another on this occasion. In another example, the users of computing devices 202(1)-(N) may have heard of one another but never come in contact with one another prior to this occasion.

In other examples, the users of computing devices 202(1)-(N) may be at least somewhat familiar with one another at the point in time that service module 106 determines that the users have come in contact with one another. For example, the users of computing devices 202(1)-(N) may have come in contact with one another on at least one prior occasion. In one example, the users of computing devices 202(1)-(N) may have met one another in person on at least one prior occasion. In another example, the users of computing devices 202(1)-(N) may have encountered one another online on at least one prior occasion.

As illustrated at step 308 in FIG. 3, one or more of the various systems described herein may provide the service to the strangers in response to the determination that the strangers registered for the service have come in contact with one another. For example, service module 106 may, as part of server 206 in FIG. 2, provide the service to the users of computing devices 202(1)-(N) in response to the determination that the users have come in contact with one another. As will be described in greater detail below, this service may be configured to determine, based at least in part on social-networking accounts 210(1)-(N) and 212(1)-(N), whether the users of computing devices 202(1)-(N) share any characteristics in common.

The systems described herein may perform step 308 in a variety of ways. In some examples, service module 106 may access social-networking accounts 210(1)-(N) and 212(1)-(N) to obtain personal information about the users of computing devices 202(1)-(N). For example, service module 106 may identify one or more usernames and passwords associated with social-networking accounts 210(1)-(N) and 212(1)-(N) stored in registration information 122. In this example, service module 106 may enter the usernames and passwords associated with social-networking accounts 210(1)-(N) and 212(1)-(N) in social-networking platforms 208(1)-(N). By entering the username and password associated with social-networking accounts 210(1)-(N) and 212(1)-(N) in social-networking platforms 208(1)-(N), service module 106 may access social-networking accounts 210(1)-(N) and 212(1)-(N) to obtain any personal information about the users of computing devices 202(1)-(N) that is included in these social-networking accounts.

Although some examples provided in connection with step 308 demonstrate that service module 106 may access the users' social-networking accounts in response to determining that the users have come in contact with one another, service module 106 may also, in other examples, access the users' social-networking accounts prior to determining that the users have come in contact with one another. For example, service module 106 may access one or more of social-networking accounts 210(1)-(N) and 212(1)-(N) and copy personal information about the users of computing devices 202(1)-(N) from such social-networking accounts to database 120 immediately after the users register for the service.

In one example, service module 106 may enter the username "JOHNJOHNSON@EMAIL.COM" and password "MYPASSWORD" in social-networking platform 208(1) to access social-networking account 210(1) associated with the user of computing device 202(1). In this example, as shown in FIG. 4, social-networking account 210(1) may include personal information that identifies the user (in this example, "John Johnson"), the user's friends (in this example, "Joe Dawson," "Chris Henneman," "Ashley Jackson," "Naomi Lewis," "Troy Richardson," and "Chip Taylor"), the user's employer (in this example, "State Insurance"), the user's past employer (in this example, "Custom Computers"), the user's education (in this example, "State University"), the user's place of residence (in this example, "Reno, Nev."), the user's religion (in this example, "Christian"), the user's political affiliation (in this example, "Liberal"), the user's favorite books (in this example, "THREE MUSKETEERS," "HAMLET," and "A TALE OF TWO CITIES"), the user's favorite movies (in this example, "GONE WITH THE WIND," "A NIGHT AT THE OPERA," and "CASABLANCA"), the user's favorite musical artists (in this example, "THE BEATLES" and "FRANK SINATRA"), and the user's hobbies (in this example, "Chess," "Gardening," and "Piano"). Upon accessing social-networking account 210(1), service module 106 may copy the user's personal information included in social-networking account 210(1) to personal information 124 located in database 120.

In one example, service module 106 may also enter the username "JJOHNSON" and password "MYOTHERPASSWORD" in social-networking platform 208(N) to access social-networking account 212(1) associated with the user of computing device 202(1). In this example, as shown in FIG. 5, social-networking account 212(1) may include personal information that identifies the user (in this example, "John Johnson"), the user's connections (in this example, "Keri Hollister," "Tracy Bowman," "Rochelle Foster," "Naomi Lewis," "Ross Harper," and "Tyler West"), the user's employer (in this example, "State Insurance"), the user's past employer (in this example, "Custom Computers"), the user's education (in this example, "State University"), and the user's place of residence (in this example, "Reno, Nev."). Upon accessing social-networking account 212(1), service module 106 may copy the user's personal information included in social-networking account 212(1) to personal information 124 located in database 120.

Similarly, service module 106 may enter the username "JANEJACKSON@EMAIL.COM" and password "PASSWORD1" in social-networking platform 208(1) to access social-networking account 210(N) associated with the user of computing device 202(N). In this example, as shown in FIG. 4, social-networking account 210(N) may include personal information that identifies the user (in this example, "Jane Jackson"), the user's friends (in this example, "Angie Adams," "Tracy Bowman," "Ron Drake," "Naomi Lewis," "Richard Newton," and "Hope Tolbert"), the user's employer (in this example, "Custom Computers"), the user's past employer (in this example, "Universal Capital"), the user's education (in this example, "State University"), the user's place of residence (in this example, "Las Vegas, Nevada"), the user's religion (in this example, "Christian"), the user's political affiliation (in this example, "Conservative"), the user's favorite books (in this example, "THE CALL OF THE WILD," "HAMLET," and "A TALE OF TWO CITIES"), the user's favorite movies (in this example, "GONE WITH THE WIND," "FORREST GUMP," and "SCHINDLER'S LIST"), the user's favorite musical artists (in this example, "TINA TURNER" and "PRINCE"), and the user's hobbies (in this example, "Painting," "Gardening," and "Guitar"). Upon accessing social-networking account 210(N), service module 106 may copy the user's personal information included in social-networking account 210(N) to personal information 124 located in database 120.

In some examples, service module 106 may analyze personal information 124 and determine, based on this analysis, whether the users of computing devices 202(1)-(N) share any characteristics in common. In one example, service module 106 may parse at least a portion of personal information 124 into informational components associated with the users. For example, service module 106 may divide at least a portion of personal information 124 associated with the users of computing devices 202(1)-(N) into informational components that represent different categories of information (such as friends, employers, places of residence, religions, political affiliation, favorite books, favorite movies, favorite musical artists, and/or hobbies).

In some examples, service module 106 may implement one or more artificial intelligence techniques used to analyze personal information 124. For example, service module 106 may implement one or more data mining and/or machine learning techniques used to (1) divide at least a portion of personal information 124 and (2) reform the portion of personal information 124 into the informational components associated with the users of computing devices 202(1)-(N). Such data mining and/or machine learning techniques may be configured to perform one or more approximation algorithms on personal information 124 to facilitate dividing and reforming the portion of personal information 124 into the informational components.

In some examples, service module 106 may be able to recognize that different types of informational components parsed from personal information 124 represent substantially similar categories of information. These different types of informational components may result from varying nomenclatures used across social-networking platforms 208(1)-(N). For example, social-networking account 210(1) in FIG. 4 includes a "friends" category of information, and social-networking account 212(1) in FIG. 5 includes a "connections" category of information. In this example, both the "friends" category included in social-networking account 210(1) and the "connections" category included in social-networking account 212(1) may effectively represent known friends of the user of computing device 202(1).

In some examples, service module 106 may treat the informational components that represent substantially similar categories of information as if they represented the same category of information. For example, service module 106 may identify at least one informational component that represents the user's friends enumerated in social-networking account 210(1) and at least one other informational component that represents the user's connections enumerated in social-networking account 212(1). In this example, service module 106 may treat both of these different types of informational components as effectively representing known friends of the user of computing device 202(1).

In some examples, upon parsing the portion of personal information 124 into informational components associated with the users of computing devices 202(1)-(N), service module 106 may compare the informational components associated with the users to determine whether the users share any characteristics in common. In one example, service module 106 may identify at least one pattern in the compared informational components that is common to both the user of computing device 202(1) and the user of computing device 202(N). For example, service module 106 may compare at least one informational component that identifies known friends of the user of computing device 202(1) with at least one other informational component that identifies known friends of the user of computing device 202(N).

In some examples, service module 106 may determine, based on this comparison of the informational components, whether the users of computing devices 202(1)-(N) share any characteristics in common. For example, service module 106 may determine that the users of computing devices 202(1)-(N) are both friends with Naomi Lewis and Tracy Bowman by identifying character patterns "Naomi Lewis" and "Tracy Bowman" in informational components that represent known friends of the users. In another example, although not demonstrated by the illustrations shown in FIGS. 4 and 5, service module 106 may determine that the users of computing devices 202(1)-(N) share no known characteristics in common.

In some examples, service module 106 may generate characteristics information 126 that indicates whether the users of computing devices 202(1)-(N) share any known characteristics in common. In one example, service module 106 may configure characteristics information 126 by identifying any informational components that represent a pattern that is common to the users of computing devices 202(1)-(N) and then reforming these informational components to facilitate presentation of these informational components to the users upon coming in contact with one another. For example, upon identifying character patterns "Naomi Lewis" and "Tracy Bowman" in informational components that represent known friends of the users of computing devices 202(1)-(N), service module 106 may reform these informational components to represent at least a portion of characteristics information 126.

In one example, as shown in FIG. 6, characteristics information 126 may include information that identifies the users that have come in contact with one another (in this example, "John Johnson" and "Jane Jackson"), friends that the users share in common (in this example, "Naomi Lewis" and "Tracy Bowman"), education that the users share in common (in this example, "State University"), an employer (whether past or present) that the users share in common (in this example, "Custom Computers"), a religion that the users share in common (in this example, "Christian"), favorite books that the users share in common (in this example, "HAMLET" and "A TALE OF TWO CITIES"), and a hobby that the users share in common (in this example, "Gardening"). In another example, although not demonstrated by the illustration shown in FIG. 6, the characteristics information generated by service module 106 may include information indicating that the users of computing devices 202(1)-(N) share no known characteristics in common.

In other examples, service module 106 may generate characteristics information that represents an abstract level of commonality between the users of computing devices 202(1)-(N). In these examples, service module 106 may ensure that the users' privacy is protected by initially withholding certain details about the users' common characteristics from the characteristics information. By initially withholding such details, service module 106 may avoid disclosing more information about the users of computing devices 202(1)-(N) than is necessary for the users to determine whether they wish to learn more about one another.

In one example, the characteristics information may include a commonality score that represents the level of commonality between the users of computing devices 202(1)-(N). For example, service module 106 may compute, based on the analysis of personal information 124, a commonality score of 75% that represents the level of commonality between the users of computing devices 202(1)-(N). In this example, the commonality score of 75% may indicate that the users of computing devices 202(1)-(N) have a fairly high level of commonality.

In addition, when computing the commonality score, service module 106 may apply weighted multipliers to certain characteristics based on the relative importance of such characteristics to the users of computing devices 202(1)-(N). For example, the users of computing device 202(1)-(N) may feel that the "religion" characteristic is twice as important to them as the other characteristics. In this example, the user of computing devices 202(1)-(N) may configure the service to apply a "2×" weighted multiplier to the portion of the computation associated with the "religion" characteristic.

Similarly, when computing the commonality score, service module 106 may override the computation based on certain incompatibilities between the users of computing devices 202(1)-(N). For example, the user of computing device 202(1) may generally dislike democrats. In this example, the user of computing device 202(1) may configure the service to always compute a commonality score of 0% whenever the user comes in contact with a democrat (regardless of whether the user and the democrat share any characteristics in common).

In another example, the characteristics information may include a heat map that graphically represents the users' level of commonality by coloring different regions of a multi-dimensional table (such as a planar or cubic table) to indicate varying degrees of commonality across different areas of interest. For example, service module 106 may generate a heat map that includes a brightly colored region that represents a relatively high level of commonality in a particular area of interest and at least one darkened region that represents a relatively low level of commonality in a different area of interest. In this example, the brightly colored region of the heat map may indicate that the users of computing devices 202(1)-(N) have several mutual friends, and the darkened region of the heat map may indicate that the users of computing devices 202(1)-(N) share no hobbies in common.

In one embodiment, service module 106 may ensure that the heat map does not initially disclose the different areas of interest represented by the different regions. For example, service module 106 may configure the heat map to simply show that the users share varying degrees of commonality across the different areas of interest represented by the different regions. In this example, service module 106 may intentionally fail to identify the different areas of interest represented by the different regions of the heat map in order to avoid disclosing more information than is necessary for the users to determine whether they wish to learn more about one another.

In a further example, the characteristics information may include a raw count that represents the number of known characteristics that the users share in common. For example, service module 106 may calculate, based on the analysis of personal information 124, a raw count indicating that the users of computing devices 202(1)-(N) share 8 known characteristics in common. In this example, the raw count may simply indicate that the users of computing devices 202(1)-(N) share 8 known characteristics in common rather than identifying the 8 known characteristics that the users share in common.

In some examples, service module 106 may provide characteristics information 126 to one or more of computing devices 202(1)-(N) to facilitate presentation of characteristics information 126 to the users of computing devices 202(1)-(N). For example, service module 106 may transmit characteristics information 126 to each of computing devices 202(1)-(N). In this example, computing devices 202(1)-(N) may each receive characteristics information 126 and then present characteristics information 126 to the users. By facilitating presentation of characteristics information 126 to the users of computing devices 202(1)-(N) when the users of computing devices 202(1)-(N) come in contact with one another, service module 106 may help the users become instantly familiar with one another and/or provide a common-ground basis upon which the users may build a friendship.

In some examples, service module 106 may act as a brokering mechanism that obtains various personal information about the users of computing devices 202(1)-(N) but avoids disclosing certain details from such personal information. For example, service module 106 may be able to access any personal information included in social-networking accounts 210(1)-(N) and 212(1)-(N) but unable to disclose certain details from such personal information. In this example, the users of computing devices 202(1)-(N) may have defined, as part of the registration process described above, which details service module 106 is able to disclose to other users that have registered for the service.

In some examples, the users of computing devices 202(1)-(N) may enable service module 106 to disclose additional details that have yet to be disclosed to one another. For example, upon reviewing the characteristics information provided to computing device 202(1), the user of computing device 202(1) may verify that he and the user of computing device 202(N) share a fairly high level of commonality. In this example, the user of computing device 202(1) may then provide permission for the service to disclose additional details about him to the user of computing device 202(N) in an attempt to learn more about one another.

Figure 7:
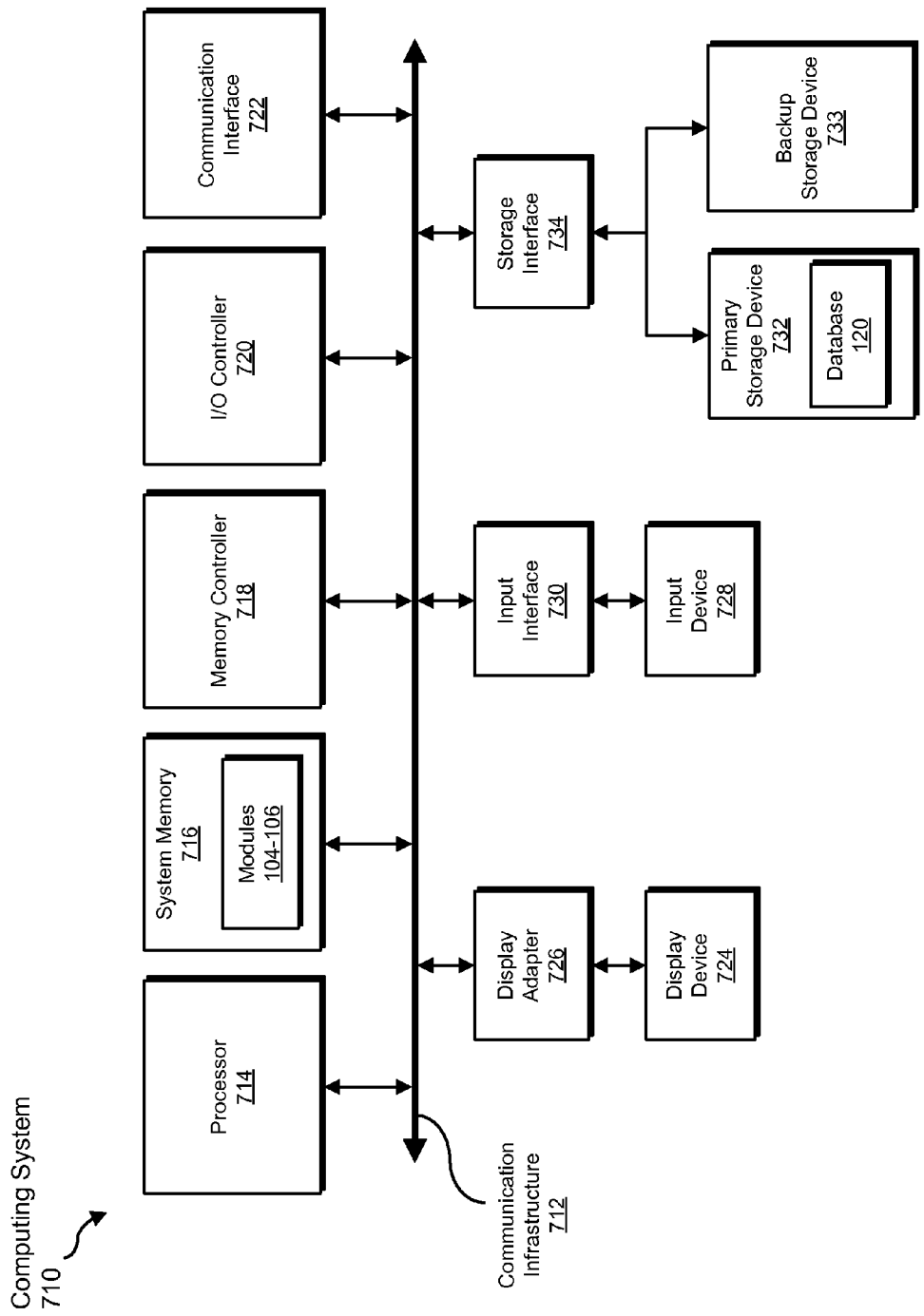
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the facilitating, obtaining, determining, providing, enabling, accessing, storing, parsing, comparing, identifying, reforming, implementing, detecting, determining, using, and receiving steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
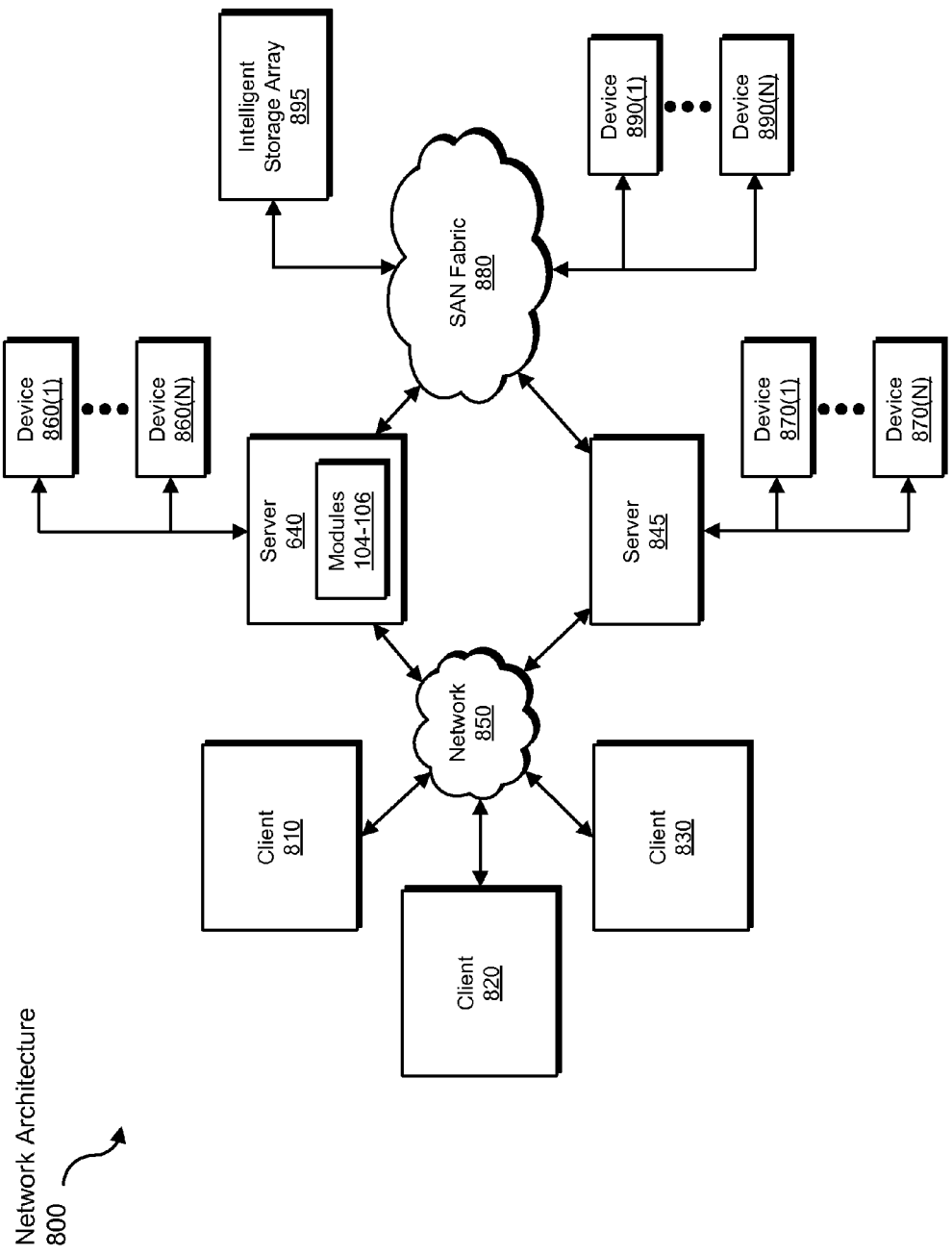
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the facilitating, obtaining, determining, providing, enabling, accessing, storing, parsing, comparing, identifying, reforming, implementing, detecting, determining, using, and receiving steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for using social-networking accounts to identify characteristics that strangers share in common.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of one or more physical devices (such computing devices 202(1)-(N) in FIG. 2) by receiving and presenting characteristics information that indicates whether strangers using such devices share any known characteristics in common.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using social-networking accounts to identify characteristics that strangers share in common, at least a portion of the method being performed by a computing device comprising at least one processor, the method comprising:
 facilitating registration for a service capable of determining whether strangers who come in physical proximity to one another share one or more characteristics in common;
 as part of the registration for the service, obtaining permission for the service to access at least a portion of a plurality of social-networking accounts associated with each of the strangers;
 subsequent to the registration for the service, determining that the strangers registered for the service have come in physical proximity to one another;
 in response to the determination that the strangers registered for the service have come in physical proximity to one another, providing the service to the strangers by:
  analyzing personal information about the strangers accessible via the social-networking accounts associated with the strangers by implementing a machine learning technique to:
   divide at least a portion of the personal information;
   reform the portion of the personal information into informational components by identifying different nomenclatural categories that include the portion of personal information across the social-networking accounts, the different nomenclatural categories representing commensurate categories of information;
   treat the informational components reformed from the different nomenclatural categories as representing commensurate categories of information;
  determining, based on the analysis of the personal information about the strangers, that the strangers share a plurality of characteristics in common;
  computing, based on the analysis of the personal information about the strangers, a commonality score that represents the level of commonality between the strangers;
  providing characteristics information indicating that the strangers share each of the plurality of characteristics in common to one or more computing devices associated with one or more of the strangers to facilitate presentation of the characteristics information to the strangers upon coming in physical proximity to one another such that the strangers are able to view and learn each of the plurality of characteristics that the strangers share in common and the level of commonality between the strangers, wherein the characteristics information includes the commonality score that represents the level of commonality between the strangers.

2. The method of claim 1, wherein obtaining permission for the service to access the strangers' social-networking accounts comprises:
 obtaining one or more usernames associated with the strangers' social-networking accounts;
 obtaining one or more passwords associated with the strangers' social-networking accounts;
 enabling the service to access the strangers' social-networking accounts by entering the usernames and passwords associated with the strangers' social-networking accounts.

3. The method of claim 1, wherein the strangers' social-networking accounts are associated with a plurality of different social-networking platforms.

4. The method of claim 1, further comprising, subsequent to the registration for the service:
 accessing the strangers' social-networking accounts to obtain the personal information about the strangers;
 storing a copy of the personal information in a storage device associated with the service to facilitate analyzing the personal information.

5. The method of claim 1, wherein analyzing the personal information accessible via the strangers' social-networking accounts comprises comparing the informational components reformed from the personal information about the strangers.

6. The method of claim 5, wherein determining whether the strangers share characteristics in common comprises, upon comparing the informational components reformed from the personal information about the strangers, identifying at least one pattern of informational components that is common to each of the strangers.

7. The method of claim 6, wherein providing the characteristics information to the strangers' computing devices comprises configuring the characteristics information by:
 identifying the informational components that represent the common pattern;
 reforming the informational components that represent the common pattern to facilitate presentation of the informational components that represent the common pattern to the strangers upon coming in physical proximity to one another.

8. The method of claim 1, wherein providing the service comprises implementing a data mining technique that provides at least a portion of the service.

9. The method of claim 1, wherein determining that the strangers registered for the service have come in physical proximity to one another comprises detecting an in-person encounter between the strangers.

10. The method of claim 1, wherein determining that the strangers registered for the service have come in physical proximity to one another comprises at least one of:
 determining that a computing device associated with a particular stranger is located physically proximate to a different computing device associated with a different stranger;
 receiving a communication manually initiated by at least one of the strangers that indicates that the strangers have come in physical proximity to one another.

11. The method of claim 10, wherein determining that the computing device is located physically proximate to the different computing device comprises using a transponder associated with the computing device and a different transponder associated with the different computing device to determine that the computing device is located physically proximate to the different computing device.

12. The method of claim 11, wherein the transponder and the different transponder each comprise at least one of:
 a near field communication ("NFC") technology;
 a radio frequency identification ("RFID") technology;
 a contactless smart card technology;
 a Bluetooth technology.

13. The method of claim 1, wherein the characteristics that the strangers share in common comprise at least one of:

a common friend;
a common acquaintance;
a common employer;
a common profession;
a common school;
a common place of residence;
a common online follower;
a common person being followed online;
a common religion;
a common relationship status;
a common political affiliation;
a common conference;
a common check-in location;
a common association with a particular organization;
a common association with a particular social-networking platform;
a common business connection;
a common musical interest;
a common favorite book;
a common favorite movie;
a common favorite musical artist;
a common favorite television show;
a common favorite game;
a common favorite activity;
a common favorite athlete;
a common hobby.

14. A system for using social-networking accounts to identify characteristics that strangers share in common, the system comprising:
a memory device that stores:
a registration module that:
facilitates registration for a service capable of determining whether strangers who come in physical proximity to one another share one or more characteristics in common;
obtains, as part of the registration for the service, permission for the service to access at least a portion of a plurality of social-networking accounts associated with each of the strangers;
a service module that:
determines, subsequent to the registration for the service, that the strangers registered for the service have come in physical proximity to one another;
provides the service to the strangers in response to the determination by:
analyzing personal information about the strangers accessible via the social-networking accounts associated with the strangers by implementing a machine learning technique to:
divide at least a portion of the personal information;
reform the portion into informational components by identifying different nomenclatural categories that include the portion of personal information across the social-networking accounts, the different nomenclatural categories representing commensurate categories of information;
treat the informational components reformed from the different nomenclatural categories as representing commensurate categories of information;
determining, based on the analysis of the personal information about the strangers, that the strangers share a plurality of characteristics in common;
computing, based on the analysis of the personal information about the strangers, a commonality score that represents the level of commonality between the strangers;
providing characteristics information indicating that the strangers share each of the plurality of characteristics in common to one or more computing devices associated with one or more of the strangers to facilitate presentation of the characteristics information to the strangers upon coming in physical proximity to one another such that the strangers are able to view and learn each of the plurality of characteristics that the strangers share in common and the level of commonality between the strangers, wherein the characteristics information includes the commonality score that represents the level of commonality between the strangers;
at least one physical processor that executes the registration module and the service module stored in the memory device.

15. The system of claim 14, wherein the registration module stored in the memory device and executed by the physical processor:
obtains one or more usernames associated with the strangers' social-networking accounts;
obtains one or more passwords associated with the strangers' social-networking accounts;
enables the service to access the strangers' social-networking accounts by entering the usernames and passwords associated with the strangers' social-networking accounts.

16. The system of claim 14, wherein the strangers' social-networking accounts are associated with a plurality of different social-networking platforms.

17. The system of claim 14, wherein the service module stored in the memory device and executed by the physical processor provides the service by at least one of:
determining that a computing device associated with a particular stranger is located physically proximate to a different computing device associated with a different stranger;
receiving a communication manually initiated by at least one of the strangers that indicates that the strangers have come in physical proximity to one another.

18. A non-transitory computer-readable-storage medium comprising one or more computer-executable instructions that, when executed by at least one processor of a computing device, cause the computing device to:
facilitate registration for a service capable of determining whether strangers who come in physical proximity to one another share one or more characteristics in common;
obtain, as part of the registration for the service, permission for the service to access at least a portion of a plurality of social-networking accounts associated with each of the strangers;
determine, subsequent to the registration for the service, that the strangers registered for the service have come in physical proximity to one another;
provide the service to the strangers in response to the determination by:
analyzing personal information about the strangers accessible via the social-networking accounts associated with the strangers by implementing a machine learning technique to:
divide at least a portion of the personal information;
reform the portion into informational components by identifying different nomenclatural categories that include the portion of personal information across the social-networking accounts, the different nomenclatural categories representing commensurate categories of information;
treat the informational components reformed from the different nomenclatural categories as representing commensurate categories of information;
determining, based on the analysis of the personal information about the strangers, that the strangers share a plurality of characteristics in common;
computing, based on the analysis of the personal information about the strangers, a commonality score that represents the level of commonality between the strangers;
providing characteristics information indicating that the strangers share each of the plurality of characteristics in common to one or more computing devices associated with one or more of the strangers to facilitate presentation of the characteristics information to the strangers upon coming in physical proximity to one another such that the strangers are able to view and learn each of the plurality of characteristics that the strangers share in common and the level of commonality between the strangers, wherein the characteristics information includes the commonality score that represents the level of commonality between the strangers.

19. The method of claim 1, wherein the characteristics information includes a heat map that graphically represents the level of commonality between the strangers;
further comprising generating, based on the analysis of the personal information about the strangers, the heat map by coloring different regions of a multi-dimensional table to indicate varying degrees of commonality across different areas of interest.

* * * * *